(12) United States Patent
Fang et al.

(10) Patent No.: US 10,171,175 B2
(45) Date of Patent: Jan. 1, 2019

(54) METHOD AND APPARATUS FOR DESPREADING IN OPTICAL DOMAIN (71) Applicant: Huawei Technologies Co., Ltd., Shenzhen (CN)

(72) Inventors: Liming Fang, Shenzhen (CN); Lei Zhou, Shenzhen (CN); Meng Sui, Shenzhen (CN); Xiaofeng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/857,019

(22) Filed: Dec. 28, 2017

(65) Prior Publication Data

US 2018/0145767 A1 May 24, 2018

Related U.S. Application Data

(63) Continuation of application No. PCT/CN2015/082882, filed on Jun. 30, 2015.

(51) Int. Cl.
*H04B 10/00* (2013.01)
*H04B 10/61* (2013.01)
(Continued)

(52) U.S. Cl.
CPC ..... *H04B 10/6162* (2013.01); *H04B 10/2504* (2013.01); *H04B 10/60* (2013.01); *H04J 13/16* (2013.01)

(58) Field of Classification Search
CPC ............ H04B 10/6162; H04B 10/2504; H04B 10/60; H04J 13/16

(Continued)

(56) References Cited

U.S. PATENT DOCUMENTS 8,594,512 B2 * 11/2013 Coelho ............... H04B 10/505
398/182
8,630,551 B2 * 1/2014 Margraf ................. G01M 11/00
398/204

(Continued)

FOREIGN PATENT DOCUMENTS

CN 101102162 A 1/2008
CN 101283528 A 10/2008
(Continued)

OTHER PUBLICATIONS

Machine Translation and Abstract of Chinese Publication No. CN104266752, Jan. 7, 2015, 7 pages.

(Continued)

*Primary Examiner* — M. R. Sedighian
(74) *Attorney, Agent, or Firm* — Conley Rose, P.C.

(57) ABSTRACT

An apparatus for despreading in an optical domain configured to split a received optical signal into a first optical signal and a second optical signal, perform phase deflection on the second optical signal, output a third optical signal, perform phase deflection on the first optical signal and the third optical signal, output a fourth optical signal and a fifth optical signal to a balanced receiver, and superimpose the fourth optical signal and the fifth optical signal to generate a first electrical signal. A multiplication operation in conventional code division multiple access (CDMA) despreading is transferred from an electrical domain to an optical domain such that a chip rate can be easily raised to 20 gigahertz (GHz) or even to 25 GHz, a maximum rate of 100 gigabits per second (Gbps) can be provided in a single wavelength, and a user requirement for high bandwidth can be met.

20 Claims, 6 Drawing Sheets (51) Int. Cl.
*H04B 10/60* (2013.01)
*H04B 10/25* (2013.01)
*H04J 13/16* (2011.01)

(58) Field of Classification Search
USPC ......................................................... 398/115
See application file for complete search history.

(56) References Cited

U.S. PATENT DOCUMENTS

| | | | |
|---|---|---|---|
| 9,473,249 B2 * | 10/2016 | Fujisawa | .............. H04B 10/614 |
| 2009/0016723 A1 | 1/2009 | Taniguchi et al. | |
| 2009/0290876 A1 | 11/2009 | Fukuchi et al. | |
| 2010/0303462 A1 | 12/2010 | Park et al. | |

FOREIGN PATENT DOCUMENTS

| | | | |
|---|---|---|---|
| CN | 102882631 A | 1/2013 | |
| CN | 104266752 A * | 1/2015 | ................ G01J 1/04 |
| EP | 2256959 A2 | 12/2010 | |
| WO | 2006001362 A1 | 1/2006 | |
| WO | 2009102164 A2 | 8/2009 | |

OTHER PUBLICATIONS

Foreign Communication From a Counterpart Application, European Application No. 15896777.8, Extended European Search Report dated Jun. 6, 2018, 7 pages.
Machine Translation and Abstract of Chinese Publication No. CN101102162, Jan. 9, 2008, 12 pages.
Machine Translation and Abstract of Chinese Publication No. CN102882631, Jan. 16, 2013, 25 pages.
Gupta, G., et al: "Over 100km Bidirectional, Multi-channels COF-PON without Optical Amplifier," PDP51, 2006, 3 pages.
Foreign Communication From a Counterpart Application, PCT Application No. PCT/CN2015/082882, English Translation of International Search Report dated Apr. 1, 2016, 2 pages.
Foreign Communication From a Counterpart Application, PCT Application No. PCT/CN2015/082882, English Translation of Written Opinion dated Apr. 1, 2016, 7 pages.

* cited by examiner

METHOD AND APPARATUS FOR DESPREADING IN OPTICAL DOMAIN

CROSS-REFERENCE TO RELATED APPLICATION

This application is a continuation of International Patent Application No. PCT/CN2015/082882 filed on Jun. 30, 2015, which is hereby incorporated by reference in its entirety.

TECHNICAL FIELD

The present disclosure relates to the communications field, and in particular, to a method and a device for despreading in an optical domain.

BACKGROUND

Figure 1:
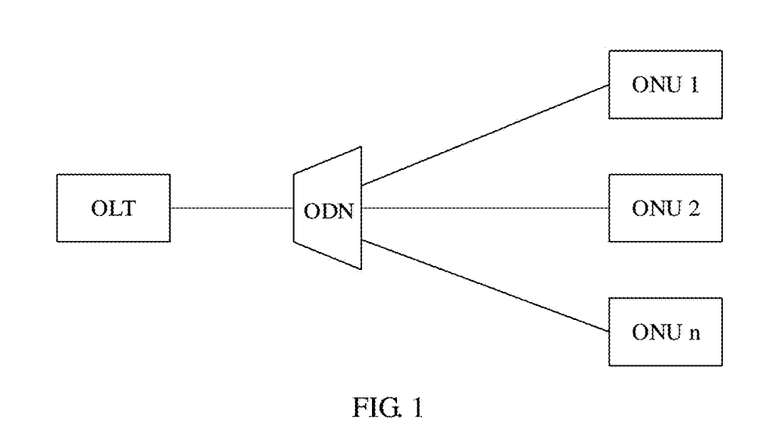
FIG. 1 is a schematic structural diagram of a PON.

As users' demand for bandwidth continuously increases, a conventional copper wire broadband access system is confronted with more bandwidth bottlenecks. At the same time, an optical fiber communications technology with a massive bandwidth capacity is increasingly mature, application costs are reduced year by year, and an optical fiber access network becomes a strong competitor of a next-generation broadband access network. In particular, a passive optical network (PON) system is more competitive. FIG. 1 shows a common network structure of the PON system. The PON system generally includes one optical line terminal (OLT) that is located in a central office, one optical distribution network (ODN) that is used for splitting/coupling or multiplexing/demultiplexing, and several optical network unit (ONUs) (designated as ONU 1, ONU 2 and ONU n).

A Code Division Multiple Access (CDMA) technology is a mature wireless communications technology developed based on a branch of a digital technology, that is, a spread spectrum communications technology. A principle of the CDMA technology is based on the spread spectrum technology, that is, modulating to-be-transmitted information data with specific signal bandwidth using a high-speed code word whose bandwidth is far higher than the signal bandwidth in order to expand bandwidth of an original data signal, and then sending the signal that undergoes carrier modulation. A receive end uses completely the same code word to perform related processing on the received broadband signal, and changes the broadband signal into a narrowband signal of the original information data, that is, despreading in order to implement information communication.

In a CDMA access manner, users do not need to maintain synchronization, multiple users share an entire channel, all the users may access a same channel at any time without complex access control, and a service does not need to wait a long time for transmission. Therefore, the CDMA access manner becomes an ideal multiple access manner, and the CDMA technology makes a great success in mobile communication. In other approaches, CDMA access control is used in an optical fiber access network, and the CDMA technology is usually used in an electrical domain.

This solution has a disadvantage that because an electronic rate is limited, a rate obtained after spreading is limited, and this manner can hardly meet a requirement of development of a future high-speed image service such as a video on demand (VOD) and a high-definition television (TV) (HDTV).

SUMMARY

Embodiments of the present disclosure provide a method and an apparatus for despreading in an optical domain in order to resolve a technical problem that a rate cannot meet a user requirement.

To achieve the foregoing objective, the following technical solutions are used in the embodiments of the present disclosure.

According to a first aspect, an apparatus for despreading in an optical domain is provided, where the apparatus includes an optical splitter configured to split a received optical signal into a first optical signal and a second optical signal, where the first optical signal is input to an optical coupler, and the second optical signal is input to an optical modulator, the optical modulator configured to perform field modulation on the second optical signal, and output a third optical signal, where a phase difference between the third optical signal and the first optical signal is a first difference, and the third optical signal is input to the optical coupler, the optical coupler configured to perform phase deflection processing on the first optical signal and the third optical signal, and output a fourth optical signal and a fifth optical signal to a balanced receiver, the balanced receiver configured to superimpose the fourth optical signal and the fifth optical signal to generate a first electrical signal, and output the first electrical signal, and an accumulator configured to accumulate the first electrical signal in each code word period.

With reference to the first aspect, in a first possible implementation of the first aspect, the optical modulator performs field modulation on the second optical signal according to a local code word.

With reference to the first or the second possible implementation of the first aspect, a polarization direction of the first optical signal is the same as a polarization direction of the third optical signal.

With reference to the first to the third possible implementations of the first aspect, the optical coupler is configured to perform phase deflection processing on the first optical signal and the third optical signal, and output a fourth optical signal and a fifth optical signal to a balanced receiver, deflect a phase of the first optical signal by the first difference, and superimposing the first optical signal and the third optical signal to obtain the fourth optical signal, and deflect a phase of the third optical signal by the first difference, and superimposing the third optical signal and the first optical signal to obtain the fifth optical signal.

With reference to any one of the first aspect or the possible implementations of the first aspect, in a fourth possible implementation of the first aspect, the balanced receiver further includes a first photodiode (PD), a second PD, and a summator, where the first PD is configured to receive the fourth optical signal, and convert the fourth optical signal into a second electrical signal. The second PD is configured to receive the fifth optical signal, and convert the fifth optical signal into a third electrical signal, and the summator is configured to superimpose the second electrical signal and the third electrical signal to obtain the first electrical signal.

With reference to any one of the first aspect or the possible implementations of the first aspect, in a fifth possible implementation of the first aspect, the apparatus further includes a phase demodulator, one end is connected to the accumulator, the other end is connected to the optical modulator, and the phase demodulator is configured to adjust a phase of a code word of the second optical signal such that the code word of the second optical signal is aligned with a code word of the received optical signal.

With reference to any one of the first aspect or the possible implementations of the first aspect, in a sixth possible implementation of the first aspect, the first difference is $\pi/2$.

According to a second aspect, an apparatus for despreading in an optical domain is provided, where the apparatus includes a first polarization beam splitter (PBS) configured to split a received optical signal into a first optical signal and a second optical signal whose polarization directions are perpendicular to each other, where the first optical signal and the second optical signal are input to a first optical coupler and a second optical coupler respectively, a local oscillator laser configured to emit a local oscillator optical signal, a second PBS configured to split the local oscillator optical signal into a third optical signal and a fourth optical signal whose polarization directions are perpendicular to each other, and a first optical modulator and a second optical modulator is configured to modulate the third optical signal and the fourth optical signal respectively to generate a fifth optical signal and a sixth optical signal, and input the fifth optical signal and the sixth optical signal to the first optical coupler and the second optical coupler respectively, where a polarization state of the fifth optical signal is the same as a polarization state of the first optical signal, and a phase difference between the fifth optical signal and the first optical signal is a first difference, and a polarization state of the sixth optical signal is the same as a polarization state of the second optical signal, and a phase difference between the sixth optical signal and the second optical signal is the first difference, the first optical coupler is configured to perform phase deflection on the first optical signal and the fifth optical signal, and output a seventh optical signal and an eighth optical signal, the second optical coupler is configured to perform phase deflection on the second optical signal and the sixth optical signal, and output a ninth optical signal and a tenth optical signal, a first balanced receiver is configured to superimpose the seventh optical signal and the eighth optical signal, and output a first electrical signal, a second balanced receiver is configured to superimpose the ninth optical signal and the tenth optical signal, and output a second electrical signal, and an accumulator is configured to accumulate the first electrical signal and the second electrical signal.

With reference to the second aspect, in a first possible implementation of the second aspect, that the first optical coupler is configured to perform phase deflection on the first optical signal and the fifth optical signal, and output a seventh optical signal and an eighth optical signal includes deflecting a phase of the fifth optical signal by the first difference, and superimposing the fifth optical signal and the first optical signal to obtain the seventh optical signal, deflecting a phase of the first optical signal by the first difference, and superimposing the first optical signal and the fifth optical signal to obtain the eighth optical signal.

With reference to the second aspect or the first possible implementation of the second aspect, in a second possible implementation of the second aspect, that the second optical coupler is configured to perform phase deflection on the second optical signal and the sixth optical signal, and output a ninth optical signal and a tenth optical signal includes deflecting a phase of the sixth optical signal by the first difference, superimposing the sixth optical signal and the second optical signal to obtain the ninth optical signal, deflecting a phase of the second optical signal by the first difference, and superimposing the second optical signal and the sixth optical signal to obtain the tenth optical signal.

With reference to any one of the second aspect or the possible implementations of the second aspect, in a third possible implementation of the second aspect, the first balanced receiver further includes a first PD, a second PD, and a first summator, where the first PD is configured to receive the seventh optical signal, and convert the seventh optical signal into a third electrical signal, and the second PD is configured to receive the eighth optical signal, and convert the eighth optical signal into a fourth electrical signal, and the first summator is configured to superimpose the third electrical signal and the fourth electrical signal, and output the first electrical signal.

With reference to any one of the second aspect or the possible implementations of the second aspect, in a fourth possible implementation of the second aspect, the second balanced receiver further includes a third PD, a fourth PD, and a second summator, where the third PD is configured to receive the ninth optical signal, and convert the ninth optical signal into a fifth electrical signal, the fourth PD is configured to receive the tenth optical signal, and convert the tenth optical signal into a sixth electrical signal, and the second summator is configured to superimpose the fifth electrical signal and the sixth electrical signal, and output the second electrical signal.

With reference to any one of the second aspect or the possible implementations of the second aspect, in a fifth possible implementation of the second aspect, the apparatus further includes a phase demodulator configured to adjust a phase of a code word of the local oscillator optical signal such that the code word of the local oscillator optical signal is aligned with a code word of the received optical signal.

With reference to any one of the second aspect or the possible implementations of the second aspect, in a sixth possible implementation of the second aspect, the apparatus further includes a first device configured to perform a square operation on the first electrical signal and the second electrical signal.

With reference to any one of the second aspect or the possible implementations of the second aspect, in a seventh possible implementation of the second aspect, the first device is an analog device, or a digital device such as an analog to digital converter (ADC).

With reference to any one of the second aspect or the possible implementations of the second aspect, in a seventh possible implementation of the second aspect, the first difference is $\pi/2$.

According to a third aspect, a method for despreading in an optical domain is provided, where the method includes splitting a received optical signal into a first optical signal and a second optical signal, performing field modulation on the first optical signal to obtain a third optical signal, where a phase difference between the third optical signal and the first optical signal is a first difference, performing phase deflection on the third optical signal and the first optical signal to obtain a fourth optical signal and a fifth optical signal, superimposing electrical signals that are obtained by converting the fourth optical signal and the fifth optical signal to generate a first electrical signal, and accumulating the first electrical signal in each code word period.

With reference to the third aspect, in a first possible implementation of the third aspect, field modulation is performed on the first optical signal according to a local code word.

With reference to the third aspect or the first possible implementation of the third aspect, in a second possible implementation of the third aspect, a polarization direction of the first optical signal is the same as a polarization direction of the third optical signal.

With reference to any one of the third aspect or the possible implementations of the third aspect, in a third possible implementation of the third aspect, performing phase deflection on the third optical signal and the first optical signal to obtain a fourth optical signal and a fifth optical signal includes deflecting a phase of the third optical signal by the first difference, superimposing the third optical signal and the first optical signal to obtain the fourth optical signal, deflecting a phase of the first optical signal by the first difference, and superimposing the first optical signal and the third optical signal to obtain the fifth optical signal.

With reference to any one of the third aspect or the possible implementations of the third aspect, in a fourth possible implementation of the third aspect, superimposing electrical signals that are obtained by converting the fourth optical signal and the fifth optical signal in order to generate a first electrical signal includes converting the fourth optical signal into a second electrical signal, converting the fifth optical signal into a third electrical signal, and superimposing the second electrical signal and the third electrical signal to obtain the first electrical signal.

With reference to any one of the third aspect or the possible implementations of the third aspect, in a fifth possible implementation of the third aspect, the method further includes adjusting a phase of a code word of the second optical signal such that the code word of the second optical signal is aligned with a code word of the received optical signal.

With reference to any one of the third aspect or the possible implementations of the third aspect, in a sixth possible implementation of the third aspect, the first difference is $\pi/2$.

According to a fourth aspect, a method for despreading in an optical domain is provided, where the method includes splitting a received optical signal into a first optical signal and a second optical signal whose polarization directions are perpendicular to each other, splitting a local oscillator optical signal emitted by a local oscillator laser into a third optical signal and a fourth optical signal whose polarization directions are perpendicular to each other, modulating the third optical signal and the fourth optical signal to generate a fifth optical signal and a sixth optical signal respectively, performing phase deflection on the first optical signal and the fifth optical signal, to obtain a seventh optical signal and an eighth optical signal, performing phase deflection on the second optical signal and the sixth optical signal, to obtain a ninth optical signal and a tenth optical signal, superimposing electrical signals obtained by converting the seventh optical signal and the eighth optical signal, to obtain a first electrical signal, superimposing electrical signals obtained by converting the ninth optical signal and the tenth optical signal to obtain a second electrical signal, superimposing the first electrical signal and the second electrical signal to obtain a third electrical signal, and accumulating the third electrical signal in each code word period.

With reference to the fourth aspect, in a first possible implementation of the fourth aspect, performing phase deflection on the first optical signal and the fifth optical signal to obtain a seventh optical signal and an eighth optical signal includes deflecting a phase of the fifth optical signal by the first difference, superimposing the fifth optical signal and the first optical signal to obtain the seventh optical signal, deflecting a phase of the first optical signal by the first difference, and superimposing the first optical signal and the fifth optical signal to obtain the eighth optical signal.

With reference to the fourth aspect or the first possible implementation of the fourth aspect, in a second possible implementation of the fourth aspect, performing phase deflection on the second optical signal and the sixth optical signal to obtain a ninth optical signal and a tenth optical signal includes deflecting a phase of the sixth optical signal by the first difference, superimposing the sixth optical signal and the second optical signal to obtain the ninth optical signal, deflecting a phase of the second optical signal by the first difference, and superimposing the second optical signal and the sixth optical signal to obtain the tenth optical signal.

With reference to any one of the fourth aspect or the possible implementations of the fourth aspect, in a third possible implementation of the fourth aspect, superimposing electrical signals obtained by converting the seventh optical signal and the eighth optical signal includes converting the seventh optical signal into a fourth electrical signal, converting the eighth optical signal into a fifth electrical signal, and superimposing the fourth electrical signal and the fifth electrical signal to obtain the first electrical signal.

With reference to any one of the fourth aspect or the possible implementations of the fourth aspect, in a fourth possible implementation of the fourth aspect, superimposing electrical signals obtained by converting the ninth optical signal and the tenth optical signal includes converting the ninth optical signal into a sixth electrical signal, converting the tenth optical signal into a seventh electrical signal, and superimposing the sixth electrical signal and the seventh electrical signal to obtain the second electrical signal.

With reference to any one of the fourth aspect or the possible implementations of the fourth aspect, in a fifth possible implementation of the fourth aspect, the method further includes adjusting a phase of a code word of the local oscillator optical signal such that the code word of the local oscillator optical signal is aligned with a code word of the received optical signal.

With reference to any one of the fourth aspect or the possible implementations of the fourth aspect, in a sixth possible implementation of the fourth aspect, the first difference is $\pi/2$.

In the embodiments of the present disclosure, a multiplication operation in conventional CDMA despreading is transferred from an electrical domain to an optical domain, and only an accumulation operation is performed in the electrical domain such that a chip rate can be easily raised to 20 gigahertz (GHz), or even to 25 GHz, a maximum rate of 100 gigabits per second (Gbps) can be provided in a single wavelength, and a user's requirement for high bandwidth can be met. In addition, the apparatus provided in the embodiments of the present disclosure requires lower costs than that required in the other approaches.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 2:
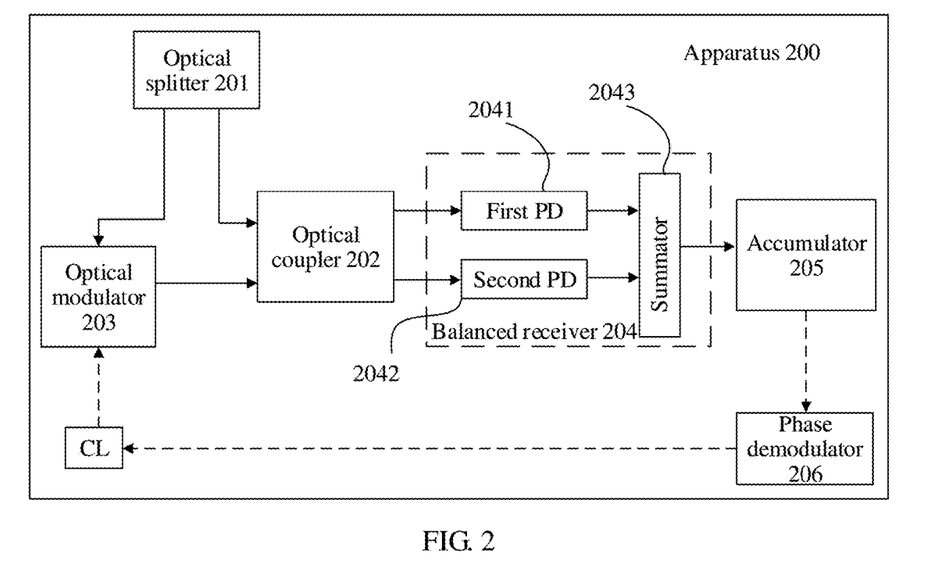
FIG. 2 is a schematic structural diagram of an apparatus for despreading in an optical domain according to an embodiment of the present disclosure.

As shown in FIG. 2, an embodiment of the present disclosure provides an apparatus 200 for despreading in an optical domain, and the apparatus 200 includes an optical splitter 201, an optical coupler 202, an optical modulator 203, and a balanced receiver 204.

The optical splitter 201 is configured to split a received optical signal into a first optical signal and a second optical signal, the first optical signal is input to the optical coupler 202, and the second optical signal is input to the optical modulator 203.

The optical modulator 203 is configured to perform field modulation on the second optical signal, and output a third optical signal, where a phase difference between the third optical signal and the first optical signal is a first difference, and the third optical signal is also input to the optical coupler 202. It should be noted that the optical modulator 203 has a phase deflection function such that a difference between a phase of the third optical signal and a phase of the first optical signal or a phase of the second optical signal is the first difference. In addition, the modulation mentioned herein is optical field modulation.

Optionally, the field modulation means to perform field modulation on the second optical signal according to a local code word. The local code word is a code word corresponding to a ready-to-receive path or user.

Preferably, the first difference is $\pi/2$.

Optionally, the first difference may be $\pi/4$, $\pi/16$, or $\pi/8$.

For example, on a transmit side, code words corresponding to user 1 to user n are respectively code 1 to code n. The local code word is a code word corresponding to the user on a receive side. For example, for the user 1, a local code word is the code 1, and for the user n, a local code word is the code n. In FIG. 2, the local code word is marked as CL.

The optical coupler 202 is configured to perform phase deflection on the first optical signal and the third optical signal, and output a fourth optical signal and a fifth optical signal, where the fourth optical signal and the fifth optical signal are separately input to the balanced receiver 204.

The balanced receiver 204 is configured to superimpose electrical signals that are obtained by converting the fourth optical signal and the fifth optical signal to generate a first electrical signal, and output the first electrical signal.

Optionally, a polarization direction of the first optical signal is the same as a polarization direction of the third optical signal.

Further, the optical coupler 202 is configured to deflect a phase of the first optical signal by the first difference, and superimpose the first optical signal and the third optical signal to obtain the fourth optical signal, and deflect a phase of the third optical signal by the first difference, and superimpose the third optical signal and the first optical signal to obtain the fifth optical signal.

Further, the balanced receiver 204 further includes a first PD 2041 configured to receive the fourth optical signal, and convert the fourth optical signal into a second electrical signal, a second PD 2042 configured to receive the fifth optical signal, and convert the fifth optical signal into a third electrical signal, and a summator 2043 configured to superimpose the second electrical signal and the third electrical signal to obtain the first electrical signal.

It should be noted that the superimposing herein may be a subtractive operation, or may be an addition operation.

Optionally, the apparatus 200 further includes an accumulator 205. The accumulator 205 is coupled to the balanced receiver 204, and is configured to accumulate, in each code word period, the first electrical signal that is output by the balanced receiver 204, and output an accumulation result.

It should be noted that the code word period is code word duration, or may be interpreted as a code word length.

Optionally, the apparatus 200 further includes a phase demodulator 206, where one end is connected to the accumulator 205, the other end is connected to the optical modulator 203, and the phase demodulator 206 is configured to adjust a phase of a code word of the second optical signal such that the code word of the second optical signal is aligned with a code word of the received optical signal.

In this embodiment of the present disclosure, a high signal-to-noise ratio SNR can be obtained by means of coherent optical receiving. In addition, accumulation is performed only in an electrical domain, and multiplication is transferred to an optical domain such that a chip rate can be easily raised to 20 GHz, or even to 25 GHz. In addition, the apparatus 200 provided in this embodiment of the present disclosure requires lower costs than that required in the other approaches.

Embodiment 2

Figure 3A:
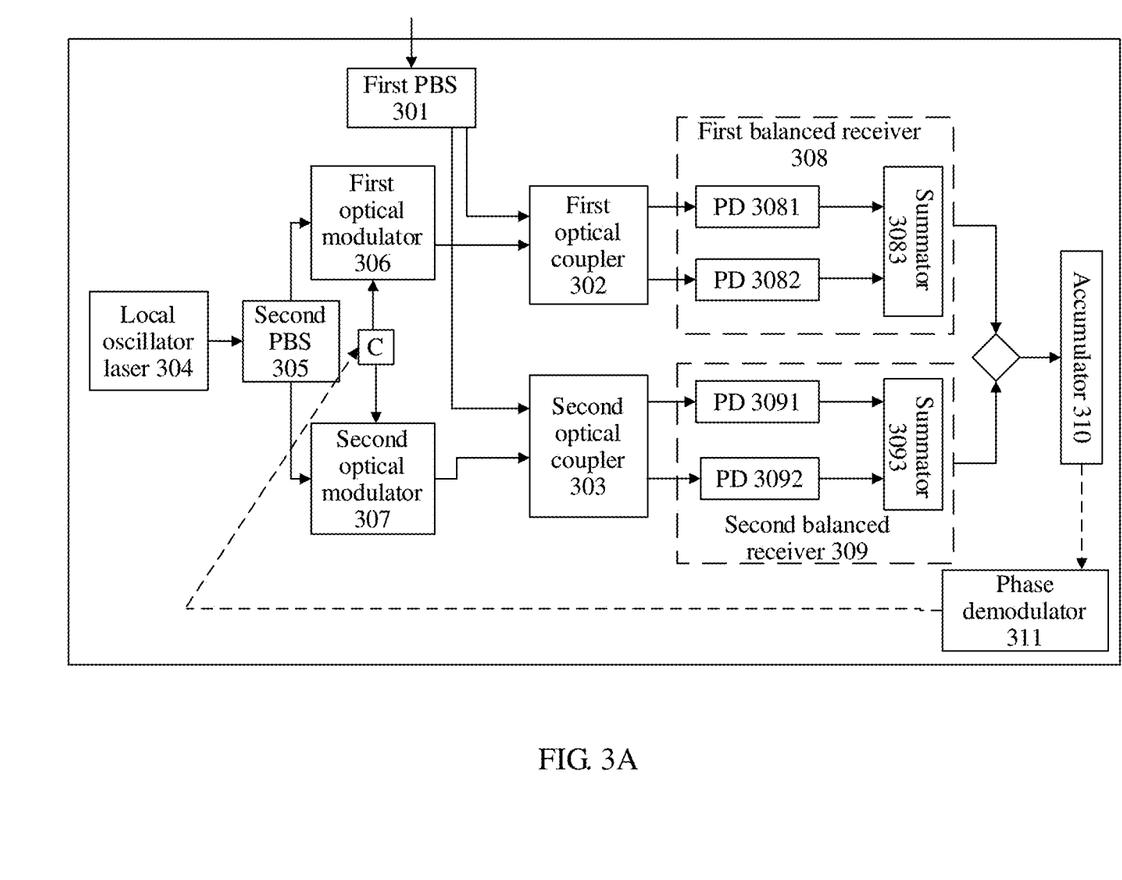
FIG. 3A is a schematic structural diagram of an apparatus for despreading in an optical domain according to another embodiment of the present disclosure.

As shown in FIG. 3A, another embodiment of the present disclosure provides an apparatus 300 for despreading in an optical domain, and the apparatus 300 includes a first PBS 301, a first optical coupler 302, a second optical coupler 303, a local oscillator laser 304, a second PBS 305, a first optical modulator 306, a second optical modulator 307, a first balanced receiver 308, a second balanced receiver 309, and an accumulator 310.

The first PBS 301 is configured to split a received optical signal into two optical signals whose polarization directions are perpendicular to each other, where the two signals are denoted as a first optical signal and a second optical signal, and output the two optical signals to the first optical coupler 302 and the second optical coupler 303 respectively.

The local oscillator laser 304 is configured to emit a local oscillator optical signal, where the emitted local oscillator optical signal is split by the second PBS 305 into two optical signals whose polarization directions are perpendicular to each other, the two signals are denoted as a third optical signal and a fourth optical signal, and are input to the first optical modulator 306 and the second optical modulator 307 respectively.

The first optical modulator 306 is configured to modulate the third optical signal to generate a fifth optical signal, and input the fifth optical signal to the first optical coupler 302. The modulation means to modulate strength of the optical signal, and a phase difference between the fifth optical signal and the first optical signal is a first difference. It should be noted that a phase of the local oscillator optical signal generated by the local oscillator laser 304 may be the same as a phase of the first optical signal, or a difference between a phase of the local oscillator optical signal and a phase of the first optical signal may be a first difference. If the phase of the local oscillator optical signal is the same as the phase of the first optical signal, when modulating the third optical signal, the first optical modulator 306 needs to deflect a phase of the third optical signal such that a difference between a phase of the fifth optical signal and the phase of the first optical signal is the first difference. That is, in this case, the first optical modulator 306 not only needs to perform strength modulation on the third optical signal, but also needs to perform phase deflection on the third optical signal. If the difference between the phase of the local oscillator optical signal and the phase of the first optical signal is the first difference, a difference between a phase of the third optical signal and the phase of the first optical signal is the first difference, and the phase difference between the fifth optical signal and the first optical signal is the first difference. In this case, the first optical modulator 306 does not need to deflect the phase of the third optical signal, and only needs to modulate the third optical signal.

Preferably, the first difference is $\pi/2$.

Optionally, the first difference may be $\pi/4$, $\pi/16$, or $\pi/8$.

The second optical modulator 307 is configured to modulate the fourth optical signal, to generate a sixth optical signal, and input the sixth optical signal to the second optical coupler 303. A phase difference between the sixth optical signal and the second optical signal is the first difference. It should be noted that the phase of the local oscillator optical signal generated by the local oscillator laser 304 may be the same as a phase of the second optical signal, or a difference between the phase of the local oscillator optical signal and a phase of the second optical signal may be the first difference. If the phase of the local oscillator optical signal is the same as the phase of the second optical signal, when modulating the fourth optical signal, the second optical modulator 307 needs to deflect a phase of the fourth optical signal such that a difference between a phase of the sixth optical signal and the phase of the second optical signal is the first difference. That is, in this case, the second optical modulator 307 not only needs to perform strength modulation on the fourth optical signal, but also needs to perform phase deflection on the fourth optical signal. If the difference between the phase of the local oscillator optical signal and the phase of the second optical signal is the first difference, a difference between a phase of the fourth optical signal and the phase of the second optical signal is the first difference, and the phase difference between the sixth optical signal and the second optical signal is the first difference. In this case, the second optical modulator 307 does not need to deflect the phase of the fourth optical signal, and only needs to modulate the fourth optical signal.

The first optical coupler 302 is configured to perform phase deflection on the first optical signal and the fifth optical signal, and output a seventh optical signal and an eighth optical signal.

The second optical coupler 303 is configured to perform phase deflection on the second optical signal and the sixth optical signal, and output a ninth optical signal and a tenth optical signal.

The first balanced receiver 308 is configured to superimpose electrical signals obtained by converting the seventh optical signal and the eighth optical signal, and output a first electrical signal.

The second balanced receiver 309 is configured to superimpose electrical signals obtained by converting the ninth optical signal and the tenth optical signal, and output a second electrical signal.

The accumulator 310 is configured to accumulate the first electrical signal and the second electrical signal in each code word period.

Figure 3B:
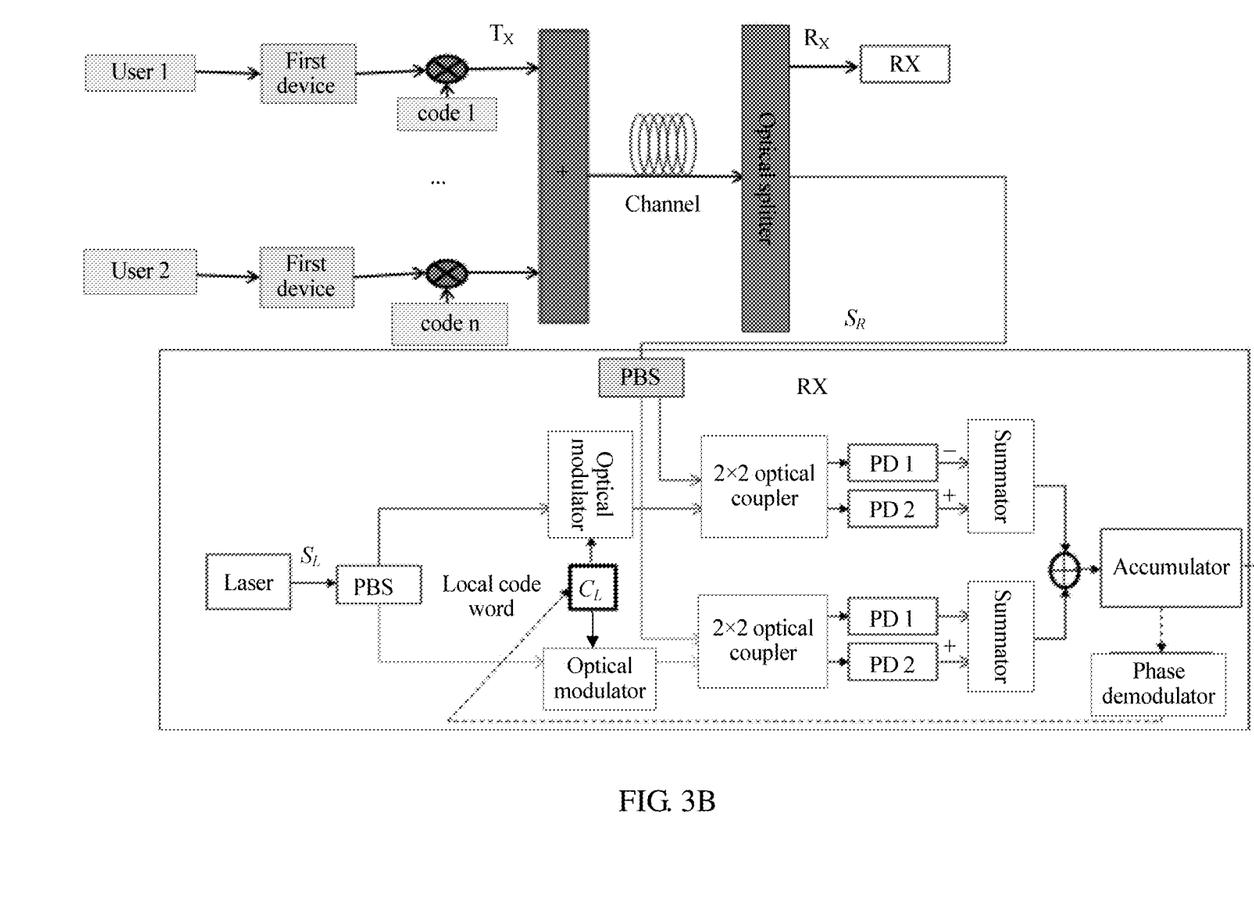
FIG. 3B is a schematic structural diagram of an apparatus for despreading in an optical domain according to still another embodiment of the present disclosure.
Figure 3C:
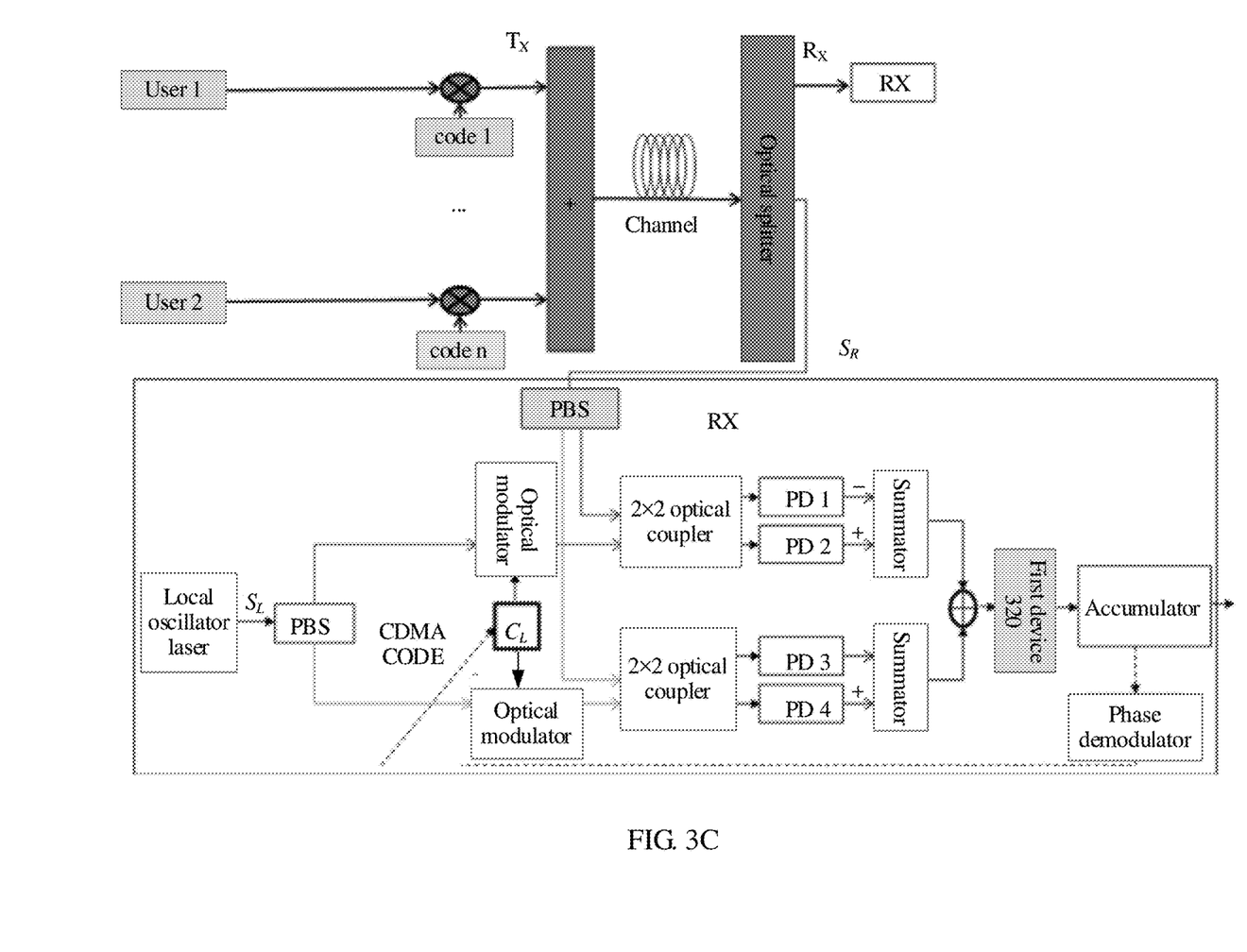
FIG. 3C is a schematic structural diagram of an apparatus for despreading in an optical domain according to yet another embodiment of the present disclosure.

Optionally, as shown in FIG. 3C, an apparatus similar to apparatus 300 shown in FIG. 3A may include a first device 320. As shown in FIG. 3C, the first device 320 may be an analog device, or may be a digital device, for example, an ADC.

The first device 320 is configured to perform a square operation on the first electrical signal and the second electrical signal.

Further, when the first device 320 is an analog device, the first electrical signal and the second electrical signal are input to two input interfaces of an analog multiplier in order to complete a square operation.

When the first device 320 is a digital device, the signals are first transferred to a digital domain using the ADC, and then a square operation is directly performed using a digital signal processor (DSP).

It should be noted that for the square operation performed on the electrical signals, reference may be made to a solution provided in the other approaches, and details are not described herein.

Optionally, in this embodiment of the present disclosure, a first device may be disposed on a transmit side as shown in FIG. 3B. For example, as shown in FIG. 3A, after a square operation is performed on an electrical signal of a user, encoding is then performed. In this solution, a first device does not need to be disposed on a receive side.

Further, based on FIG. 3A, the first optical coupler 302 is configured to deflect the phase of the fifth optical signal by the first difference, superimpose the fifth optical signal and the first optical signal to obtain the seventh optical signal, deflect the phase of the first optical signal by the first difference, and superimpose the first optical signal and the fifth optical signal to obtain the eighth optical signal.

Further, the second optical coupler 303 is configured to deflect the phase of the sixth optical signal by the first difference, superimpose the sixth optical signal and the second optical signal to obtain the ninth optical signal, deflect the phase of the second optical signal by the first difference, and superimpose the second optical signal and the sixth optical signal to obtain the tenth optical signal.

Further, the first balanced receiver 308 includes a PD 3081, a PD 3082, and a summator 3083.

The PD 3081 is configured to receive the seventh optical signal, and convert the seventh optical signal into a third electrical signal.

The PD 3082 is configured to receive the eighth optical signal, and convert the eighth optical signal into a fourth electrical signal.

The summator 3083 is configured to superimpose the third electrical signal and the fourth electrical signal, and output the first electrical signal.

It should be noted that the superimposing may be a subtractive operation, or may be an addition operation.

Further, the second balanced receiver 309 includes a PD 3091, a PD 3092, and a summator 3093.

The PD 3091 is configured to receive the ninth optical signal, and convert the ninth optical signal into a fifth electrical signal.

The PD 3092 is configured to receive the tenth optical signal, and convert the tenth optical signal into a sixth electrical signal.

The summator 3093 is configured to superimpose the fifth electrical signal and the sixth electrical signal, and output the second electrical signal. It should be noted that the superimposing may be a subtractive operation, or may be an addition operation.

Optionally, the apparatus 300 further includes a phase demodulator 311 configured to adjust a phase of a code word of the local oscillator optical signal such that the code word of the local oscillator optical signal is aligned with a code word of the received optical signal.

In this embodiment of the present disclosure, a high SNR can be obtained by means of coherent optical receiving. In addition, accumulation is performed only in an electrical domain, and multiplication is transferred to an optical domain such that a chip rate can be easily raised to 20 GHz, or even to 25 GHz. In addition, the apparatus provided in this embodiment of the present disclosure requires lower costs than that required in the other approaches.

Embodiment 3

This embodiment of the present disclosure further provides a method for despreading in an optical domain, where the method includes the following steps.

Figure 4:
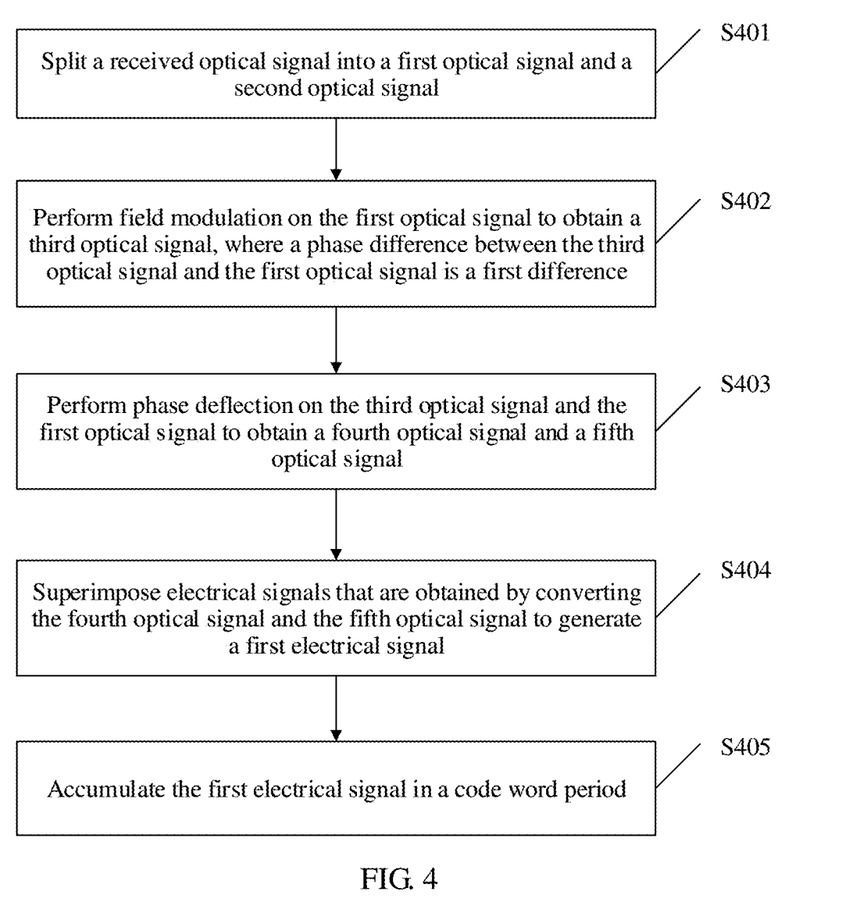
FIG. 4 is a schematic flowchart diagram of steps in a method for despreading in an optical domain according to an embodiment of the present disclosure.

Step S401: Split a received optical signal into a first optical signal and a second optical signal.

Step S402: Perform field modulation on the first optical signal to obtain a third optical signal, where a phase difference between the third optical signal and the first optical signal is a first difference.

Step S403: Perform phase deflection on the third optical signal and the first optical signal to obtain a fourth optical signal and a fifth optical signal.

Step S404: Superimpose electrical signals that are obtained by converting the fourth optical signal and the fifth optical signal to generate a first electrical signal.

Step S405: Accumulate the first electrical signal in a code word period.

Field modulation is performed on the first optical signal according to a local code word.

Optionally, a polarization direction of the first optical signal is the same as a polarization direction of the third optical signal.

Further, performing phase deflection on the third optical signal and the first optical signal to obtain a fourth optical signal and a fifth optical signal includes deflecting a phase of the third optical signal by the first difference, superimposing the third optical signal and the first optical signal to obtain the fourth optical signal, deflecting a phase of the first optical signal by the first difference, and superimposing the first optical signal and the third optical signal to obtain the fifth optical signal.

Further, superimposing electrical signals that are obtained by converting the fourth optical signal and the fifth optical signal in order to generate a first electrical signal includes converting the fourth optical signal into a second electrical signal, converting the fifth optical signal into a third electrical signal, and superimposing the second electrical signal and the third electrical signal to obtain the first electrical signal.

Optionally, the method further includes adjusting a phase of a code word of the second optical signal such that the code word of the second optical signal is aligned with a code word of the received optical signal.

Preferably, the first difference is $\pi/2$.

Optionally, the first difference may be $\pi/4$, $\pi/16$, or $\pi/8$.

Embodiment 4

This embodiment of the present disclosure further provides a method for despreading in an optical domain, where the method includes the following steps.

Figure 5:
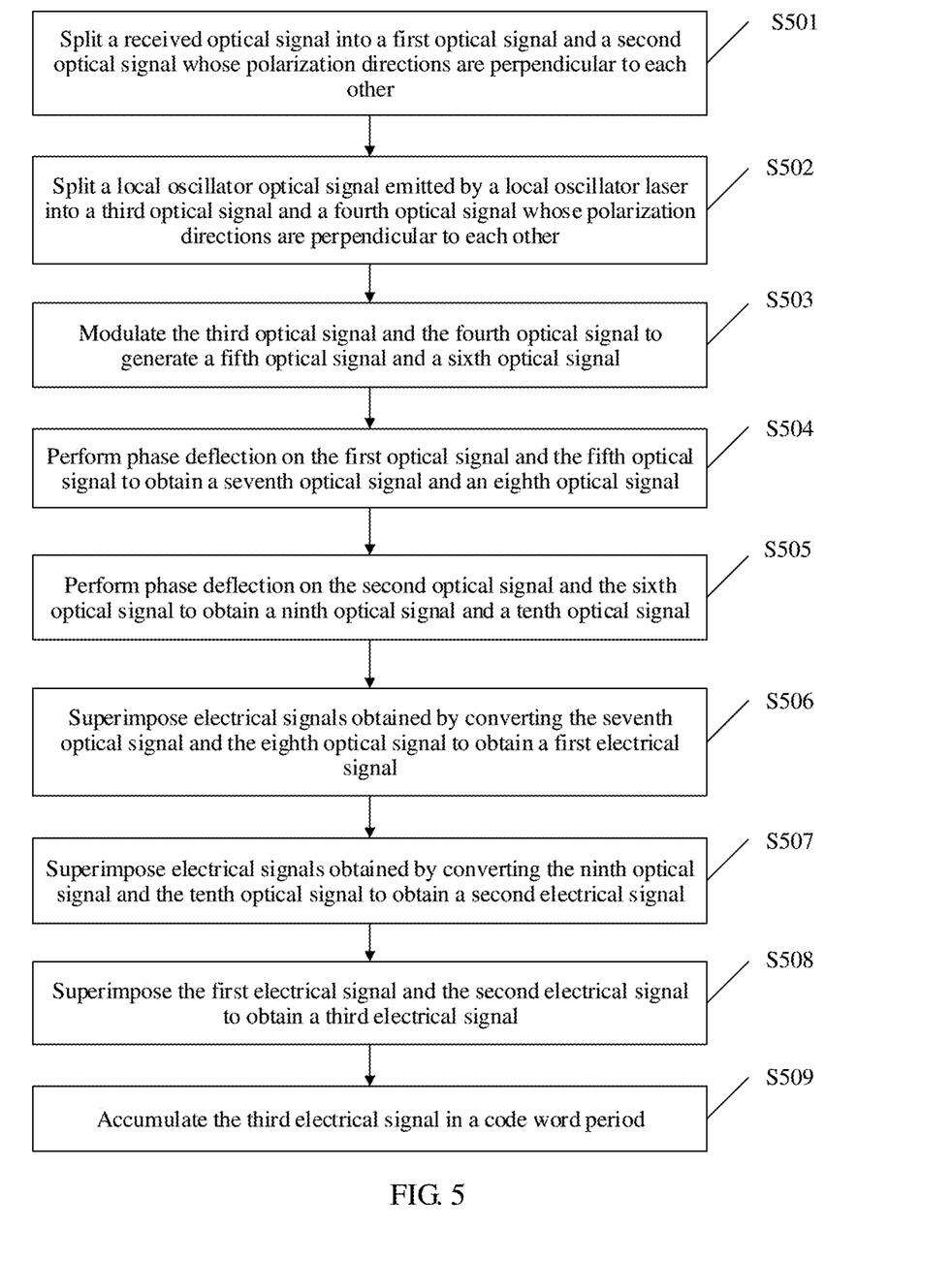
FIG. 5 is a schematic flowchart diagram of steps in a method for despreading in an optical domain according to another embodiment of the present disclosure.

Step S501: Split a received optical signal into a first optical signal and a second optical signal whose polarization directions are perpendicular to each other.

Step S502: Split a local oscillator optical signal emitted by a local oscillator laser into a third optical signal and a fourth optical signal whose polarization directions are perpendicular to each other.

Step S503: Modulate the third optical signal and the fourth optical signal to generate a fifth optical signal and a sixth optical signal.

Step S504: Perform phase deflection on the first optical signal and the fifth optical signal, to obtain a seventh optical signal and an eighth optical signal.

Step S505: Perform phase deflection on the second optical signal and the sixth optical signal to obtain a ninth optical signal and a tenth optical signal.

Step S506: Superimpose electrical signals obtained by converting the seventh optical signal and the eighth optical signal to obtain a first electrical signal.

Step S507: Superimpose electrical signals obtained by converting the ninth optical signal and the tenth optical signal to obtain a second electrical signal.

Step S508: Superimpose the first electrical signal and the second electrical signal to obtain a third electrical signal.

Step S509: Accumulate the third electrical signal in a code word period.

Optionally, before step S509, the method further includes performing a square operation on the first electrical signal and the second electrical signal.

The square operation may be completed using a digital device, such as an ADC or an analog device.

It should be noted that the foregoing step numbers S501 to S509 are not a limitation to a step performing sequence. For example, step 501 and step 502 may occur at the same time, or may occur in sequence. The same is true of other steps, and a sequence of performing the steps is not limited in the present disclosure. A person of ordinary skill in the art may clearly obtain the present disclosure according to a known art after learning the method provided in the present disclosure.

Further, performing phase deflection on the first optical signal and the fifth optical signal to obtain a seventh optical signal and an eighth optical signal includes deflecting a phase of the fifth optical signal by the first difference, superimposing the fifth optical signal and the first optical signal to obtain the seventh optical signal, deflecting a phase of the first optical signal by the first difference, and superimposing the first optical signal and the fifth optical signal to obtain the eighth optical signal.

Preferably, the first difference is $\pi/2$.

Optionally, the first difference may be $\pi/4$, $\pi/16$, or $\pi/8$.

Further, performing phase deflection on the second optical signal and the sixth optical signal to obtain a ninth optical signal and a tenth optical signal includes deflecting a phase of the sixth optical signal by the first difference, superimposing the sixth optical signal and the second optical signal to obtain the ninth optical signal, deflecting a phase of the second optical signal by the first difference, and superimposing the second optical signal and the sixth optical signal to obtain the tenth optical signal.

The superimposing electrical signals obtained by converting the seventh optical signal and the eighth optical signal includes converting the seventh optical signal into a fourth electrical signal, converting the eighth optical signal into a fifth electrical signal, and superimposing the fourth electrical signal and the fifth electrical signal, to obtain the first electrical signal.

The superimposing may be a subtractive operation, or may be an addition operation.

The superimposing electrical signals obtained by converting the ninth optical signal and the tenth optical signal includes converting the ninth optical signal into a sixth electrical signal, converting the tenth optical signal into a seventh electrical signal, and superimposing the sixth electrical signal and the seventh electrical signal, to obtain the second electrical signal.

The superimposing may be a subtractive operation, or may be an addition operation.

Optionally, the method further includes adjusting a phase of a code word of the local oscillator optical signal such that the code word of the local oscillator optical signal is aligned with a code word of the received optical signal.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An apparatus for despreading in an optical domain, comprising:
    an optical splitter configured to:
        split a received optical signal into a first optical signal and a second optical signal;
        output the first optical signal to an optical coupler; and
        output the second optical signal to an optical modulator,
    wherein the optical modulator is coupled to the optical splitter and is configured to:
        perform field modulation on the second optical signal to obtain a third optical signal; and
        output the third optical signal to the optical coupler, wherein a phase difference between the third optical signal and the first optical signal is a first difference,
    wherein the optical coupler is coupled to the optical splitter and the optical modulator and is configured to:
        perform phase deflection processing on the first optical signal and the third optical signal to obtain a fourth optical signal and a fifth optical signal respectively; and
        output the fourth optical signal and the fifth optical signal to a balanced receiver,
    wherein the balanced receiver is coupled to the optical coupler and is configured to:
        superimpose electrical signals obtained by converting the fourth optical signal and the fifth optical signal to generate a first electrical signal; and
        output the first electrical signal to an accumulator, and
    wherein the accumulator is coupled to the balanced receiver and is configured to accumulate the first electrical signal in each code word period.

2. The apparatus according to claim 1, wherein the optical modulator is further configured to perform the field modulation on the second optical signal according to a local code word.

3. The apparatus according to claim 1, wherein a polarization direction of the first optical signal is the same as a polarization direction of the third optical signal.

4. The apparatus according to claim 1, wherein when performing the phase deflection processing on the first optical signal and the third optical signal and before outputting the fourth optical signal and the fifth optical signal to the balanced receiver, the optical coupler is further configured to:
    deflect a phase of the first optical signal by the first difference;
    superimpose the first optical signal and the third optical signal to obtain the fourth optical signal;
    deflect a phase of the third optical signal by the first difference; and
    superimpose the third optical signal and the first optical signal to obtain the fifth optical signal.

5. The apparatus according to claim 1, wherein the balanced receiver comprises:
    a first photodiode (PD) configured to:
        receive the fourth optical signal; and
        convert the fourth optical signal into a second electrical signal;
    a second PD configured to:
        receive the fifth optical signal; and
        convert the fifth optical signal into a third electrical signal; and
    a summator coupled to the first PD and the second PD and configured to superimpose the second electrical signal and the third electrical signal to obtain the first electrical signal.

6. The apparatus according to claim 5, further comprising a phase demodulator, wherein one end of the phase demodulator is coupled to the accumulator, wherein the other end of the phase demodulator is coupled to the optical modulator, and wherein the phase demodulator is configured to adjust a phase of a code word of the second optical signal to align the code word of the second optical signal with a code word of the received optical signal.

7. The apparatus according to claim 1, wherein the first difference is $\pi/2$.

8. An apparatus for despreading in an optical domain, comprising:
    a first polarization beam splitter (PBS) configured to:
        split a received optical signal into a first optical signal and a second optical signal, wherein polarization directions of the first optical signal and the second optical signal are perpendicular to each other;
        output the first optical signal to a first optical coupler; and
        output the second optical signal to a second optical coupler;
    a local oscillator laser configured to emit a local oscillator optical signal;

a second PBS coupled to the local oscillator laser and configured to split the local oscillator optical signal into a third optical signal and a fourth optical signal, wherein polarization directions of the third optical signal and the fourth optical signal are perpendicular to each other;

a first optical modulator coupled to the second PBS and configured to:

perform field modulation on the third optical signal to generate a fifth optical signal; and output the fifth optical signal to the first optical coupler, wherein a phase difference between the fifth optical signal and the first optical signal is a first difference;

a second optical modulator coupled to the second PBS and configured to:

perform the field modulation on the fourth optical signal to generate a sixth optical signal; and output the sixth optical signal to the second optical coupler, wherein a phase difference between the sixth optical signal and the second optical signal is the first difference, wherein the first optical coupler coupled to the first PBS and the first optical modulator and configured to:

perform phase deflection on the first optical signal and the fifth optical signal to obtain a seventh optical signal and an eighth optical signal respectively; and output the seventh optical signal and the eighth optical signal, wherein the second optical coupler coupled to the first PBS and the second optical modulator and configured to:

perform the phase deflection on the second optical signal and the sixth optical signal to obtain a ninth optical signal and a tenth optical signal respectively; and output the ninth optical signal and the tenth optical signal;

a first balanced receiver coupled to the first optical coupler and configured to:

superimpose electrical signals obtained by converting the seventh optical signal and the eighth optical signal; and output a first electrical signal;

a second balanced receiver coupled to the second optical coupler and configured to:

superimpose electrical signals obtained by converting the ninth optical signal and the tenth optical signal; and output a second electrical signal; and an accumulator coupled to the first balanced receiver and the second balanced receiver and configured to accumulate the first electrical signal and the second electrical signal in each code word period.

9. The apparatus according to claim 8, further comprising a first device coupled to the first balanced receiver and the second balanced receiver and configured to perform a square operation on the first electrical signal and the second electrical signal.

10. The apparatus according to claim 8, wherein when performing the phase deflection on the first optical signal and the fifth optical signal and before outputting the seventh optical signal and the eighth optical signal, the first optical coupler is further configured to:

deflect a phase of the fifth optical signal by the first difference;

superimpose the fifth optical signal and the first optical signal to obtain the seventh optical signal;

deflect a phase of the first optical signal by the first difference; and superimpose the first optical signal and the fifth optical signal to obtain the eighth optical signal.

11. The apparatus according to claim 8, wherein when performing the phase deflection on the second optical signal and the sixth optical signal and before outputting the ninth optical signal and the tenth optical signal, the second optical coupler is further configured to:

deflect a phase of the sixth optical signal by the first difference;

superimpose the sixth optical signal and the second optical signal to obtain the ninth optical signal;

deflect a phase of the second optical signal by the first difference; and superimpose the second optical signal and the sixth optical signal to obtain the tenth optical signal.

12. The apparatus according to claim 8, wherein the first balanced receiver comprises:

a first photodiode (PD) configured to:

receive the seventh optical signal; and convert the seventh optical signal into a third electrical signal;

a second PD configured to:

receive the eighth optical signal; and convert the eighth optical signal into a fourth electrical signal; and a first summator coupled to the first PD and the second PD and configured to:

superimpose the third electrical signal and the fourth electrical signal to obtain the first electrical signal; and output the first electrical signal.

13. The apparatus according to claim 8, further comprising a phase demodulator configured to adjust a phase of a code word of the local oscillator optical signal to align the code word of the local oscillator optical signal with a code word of the received optical signal.

14. The apparatus according to claim 8, wherein the first difference is $\pi/2$.

15. A method for despreading in an optical domain, comprising:

splitting a received optical signal into a first optical signal and a second optical signal;

performing field modulation on the second optical signal to obtain a third optical signal, wherein a phase difference between the third optical signal and the first optical signal is a first difference;

performing phase deflection on the third optical signal and the first optical signal to obtain a fourth optical signal and a fifth optical signal respectively;

superimposing electrical signals obtained by converting the fourth optical signal and the fifth optical signal to generate a first electrical signal; and accumulating the first electrical signal in each code word period.

16. The method according to claim 15, wherein performing the field modulation comprises performing the field modulation on the first optical signal according to a local code word.

17. The method according to claim 15, wherein a polarization direction of the first optical signal is the same as a polarization direction of the third optical signal.

18. The method according to claim 15, wherein performing the phase deflection on the third optical signal and the first optical signal comprises:

deflecting a phase of the third optical signal by the first difference;

superimposing the third optical signal and the first optical signal to obtain the fourth optical signal;

deflecting a phase of the first optical signal by the first difference; and superimposing the first optical signal and the third optical signal to obtain the fifth optical signal.

19. The method according to claim 15, wherein superimposing the electrical signals comprises:

converting the fourth optical signal into a second electrical signal;

converting the fifth optical signal into a third electrical signal; and superimposing the second electrical signal and the third electrical signal to obtain the first electrical signal.

20. The method according to claim 15, further comprising adjusting a phase of a code word of the second optical signal to align the code word of the second optical signal with a code word of the received optical signal.

* * * * *